(12) United States Patent
Konkka et al.

(10) Patent No.: US 7,697,961 B2
(45) Date of Patent: Apr. 13, 2010

(54) MOBILE COMMUNICATION TERMINAL AND MOBILE COMMUNICATION SYSTEM, AND METHOD THEREFORE

(75) Inventors: Katja Konkka, Tampere (FI); Sanna Koskinen, Tampere (FI); Sanna Lindroos, Tampere (FI); Nina Maki, Tampere (FI); Paivi Jokinen, Tampere (FI); Juha Pusa, Pirkkala (FI)

(73) Assignee: Nokia Corporation, Espoo (FI)

( * ) Notice: Subject to any disclaimer, the term of this patent is extended or adjusted under 35 U.S.C. 154(b) by 535 days.

(21) Appl. No.: 11/136,308

(22) Filed: May 24, 2005

(65) Prior Publication Data

US 2006/0270460 A1    Nov. 30, 2006

(51) Int. Cl.
*H04B 1/38* (2006.01)
*H04M 1/00* (2006.01)

(52) U.S. Cl. .................... 455/566; 455/550.1; 455/90.3
(58) Field of Classification Search ................ 455/566, 455/550.1, 575.1–575.6, 41.2–41.3, 90.1–90.3, 455/569.1, 3.06, 66.1, 158.4, 556.1
See application file for complete search history.

(56) References Cited

U.S. PATENT DOCUMENTS

| | | | | |
|---|---|---|---|---|
| 5,880,732 | A | 3/1999 | Tryding | 345/352 |
| 6,297,945 | B1 * | 10/2001 | Yamamoto | 361/681 |
| 6,587,700 | B1 * | 7/2003 | Meins et al. | 455/575.8 |
| 6,825,830 | B1 * | 11/2004 | Kanesaka et al. | 345/156 |
| 7,058,426 | B2 * | 6/2006 | Masuda et al. | 455/566 |
| 7,218,956 | B2 * | 5/2007 | Okawa | 455/566 |
| 2001/0055962 | A1 | 12/2001 | Chiba | 455/412 |
| 2002/0080090 | A1 | 6/2002 | Borgstom et al. | 345/1.1 |

FOREIGN PATENT DOCUMENTS

KR    2002-0090453 A    12/2002

(Continued)

OTHER PUBLICATIONS

"Nokia 9210 Communicator", User's Guide, 9352303 Issue 3, 2001, p. 1-276.

(Continued)

*Primary Examiner*—Eugene Yun
(74) *Attorney, Agent, or Firm*—Perman & Green LLP (57) ABSTRACT

A telecommunication system comprising a mobile telecommunication network and a mobile communication apparatus arranged to communicate with said mobile telecommunication network is disclosed. The mobile communication apparatus comprises a controller, and is associated with a first and a second display, wherein said controller is arranged to control said first display to view a first set of information and said second display to view a second set of information. A method for providing messages in the telecommunication system is also disclosed. The method comprises sending a message from said mobile telecommunication network to said mobile communication apparatus; receiving said message by said mobile communication apparatus; determining if one of said first and second displays is currently actively used; assigning said message information to the one of said first or second display not currently actively used to avoid interruption of an active session; and viewing said message information on said assigned display. A method for controlling the mobile communication apparatus, comprising viewing on said first display a first set of information, and viewing on said second display a second set of information, is also disclosed.

19 Claims, 8 Drawing Sheets

FOREIGN PATENT DOCUMENTS

KR  2004-0055141 A  6/2004

OTHER PUBLICATIONS

"Nokia 9210i Communicator", User's Guide, 9357546 Issue 4 EN, 2000-2003, pp. 1-289.

Nokia 9110 Communicator "User's Manual", 9357168 Issue 3 EN, 1999, p. 1-190.

Korean Non-Final Rejection (English Translation), KR Application No. 10-2007-7029740, dated Feb. 25, 2009.

* cited by examiner

Waypoint description:
Good fishing pool. Pheasant Tail and Partridge & Orange soft hackles work well as do the BWO, and a Cream Caddis Back    Navigate    Menu

MOBILE COMMUNICATION TERMINAL AND MOBILE COMMUNICATION SYSTEM, AND METHOD THEREFORE

TECHNICAL FIELD

The present invention relates to an improved mobile communication apparatus, a method for the apparatus, a mobile communication system, and a method for the system.

BACKGROUND OF THE INVENTION

Many models of mobile communication apparatuses of today are provided with two displays. It is common that a main display is used when actively using the apparatus, e.g. for browsing, and-a secondary display is used to show information during stand-by. As the mobile communication apparatus becomes a more important tool for its user, there is a need for improvements.

SUMMARY OF THE INVENTION

In view of the above, an objective of the invention is to solve or at least reduce the problems discussed above. In particular, an objective is to improve the use of multiple displays associated with a mobile communication apparatus.

According to a first aspect of the present invention there is provided a mobile communication apparatus comprising a controller, and being associated with a first display and a second display, wherein said controller is arranged to control said first display to view a first set of information and said second display to view a second set of information.

An advantage of this is an improved user interface with improved information presentation, which is particularly important on portable devices, where physical dimensions are crucial, and thus display areas are limited.

The first and second displays may be arranged in said mobile communication apparatus. One of said first and second displays may be arranged in an external device, said device being a watch, a headset, a handsfree device, or a video system.

The first information may comprise image information and said second information may comprise text information. The first information may relate to a first view associated with an application and said second information may relate to a second view associated with said application. The first information may be associated with a first application and said second information may be associated with a second application. The first information may relate to a first part of a view associated with an application and the second information may relate to a second part of said view associated with said application. The first and second information may be distributed according to a user defined assignment. The first information may relate to an application executed on said apparatus on request of a user, and said second information may relate to an advertising message provided from a telecommunication network in which said apparatus is arranged to work.

Advantages of these features are provision of versatility, which implies that information is viewed in a proper way in all situations.

The mobile communication apparatus may be arranged to assign incoming message information to one of said first or second display not currently actively used to avoid interruption of an active session.

An advantage of this is that current sessions are still viewed while an incoming information related to a message can be viewed.

According to a second aspect of the present invention there is provided a method for controlling a mobile communication apparatus being associated with a first display and a second display, comprising viewing on said first display a first set of information, and viewing on said second display a second set of information.

The first information may comprise image information and said second information may comprise text information.

The method may further comprise executing an application, wherein said first information relates to a first view associated with said application and said second information relates to a second view associated with said application.

The method may further comprise executing a first application; and executing a second application, wherein said first information is associated with said first application and said second information is associated with said second application.

The method may further comprise executing an application, wherein said first information relates to a first part of a view associated with said application and said second information relates to a second part of said view associated with said application.

The method may further comprise inputting an information distribution; and assigning said first and second information according to said information distribution.

The method may further comprise inputting a request for an application to be executed; executing an application according to said request; receiving an advertising message; assigning viewing of said first information to said application; and assigning viewing of said second information to said advertising message.

The method may further comprise receiving a message comprising message information; determining if one of said first and second displays is currently actively used; and assigning said message information to the one of said first or second display not currently actively used to avoid interruption of an active session.

According to a third aspect of the present invention there is provided a telecommunication system comprising a mobile telecommunication network and a mobile communication apparatus arranged to communicate with said mobile telecommunication network, wherein said mobile communication apparatus comprises a controller, and is associated with a first display and a second display, wherein said controller is arranged to control said first display to view a first set of -information and said second display to view a second set of information.

The first and second displays may be arranged in said mobile communication apparatus. One of said first and second displays may be arranged in an external device, said device being a watch, a headset, a handsfree device, or a video system.

The telecommunication network may comprise means for sending messages to said mobile communication apparatus, the mobile communication apparatus may be arranged to receive said message, the first information may relate to an application executed on said mobile communication apparatus on request of a user, and the second information may relate to said message provided from said telecommunication network.

The mobile communication apparatus may be arranged to assign incoming message information to one of said first or second display not currently actively used to avoid interruption of an active session.

The message may be an advertising message.

According to a fourth aspect of the present invention there is provided a method for providing messages in a telecommunication system comprising a mobile telecommunication network and a mobile communication apparatus arranged to communicate with said mobile telecommunication network and being associated with a first display and a second display. The method comprises sending a message from said mobile telecommunication networ to said mobile communication apparatus; receiving said message by said mobile communication apparatus; determining if one of said first and second displays is currently actively used; assigning said message information to the one of said first or second display not currently actively used to avoid interruption of an active session; and viewing said message information on said assigned display.

The message may be an advertising message.

The advantages of the features of the second, third, and fourth aspects of the present invention are similar to those of the first aspect of the present invention.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one in-stance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
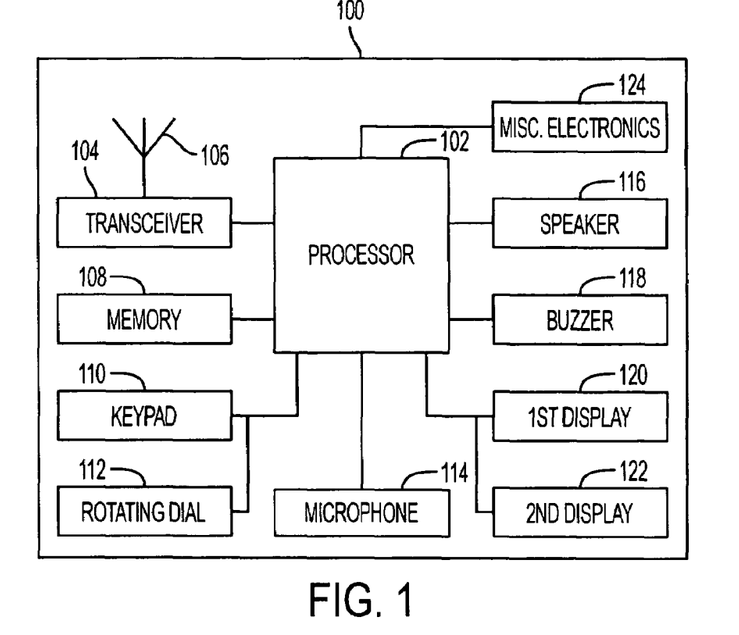
FIG. 1 shows a block diagram of a mobile communication apparatus according to an embodiment of the present invention.

FIG. 1 shows a block diagram of a mobile communication apparatus 100 according to an embodiment of the present invention. The mobile communication apparatus 100 can comprise a processor 102 for controlling operation of the mobile communication apparatus 100, a transceiver 104 connected to an antenna 106 for wireless communication, a memory 108 for storing data and programs to be used by the processor 102, a keypad 110 and/or a rotating dial 112 for user input, a microphone 114 and a speaker 116 for audio input and output, a buzzer 118 and/or a vibrator (not shown) for providing alerts such as ring signals, a first display 120 and a second display 122 for providing visual output, and miscellaneous electronics 124, such as camera, communication ports, e.g. IrDA, USB, etc, GPS receiver, and/or sensor means for temperature, compass direction, light, etc. Operation of the first and second displays 120, 122 will be further described below.

Figure 2A:
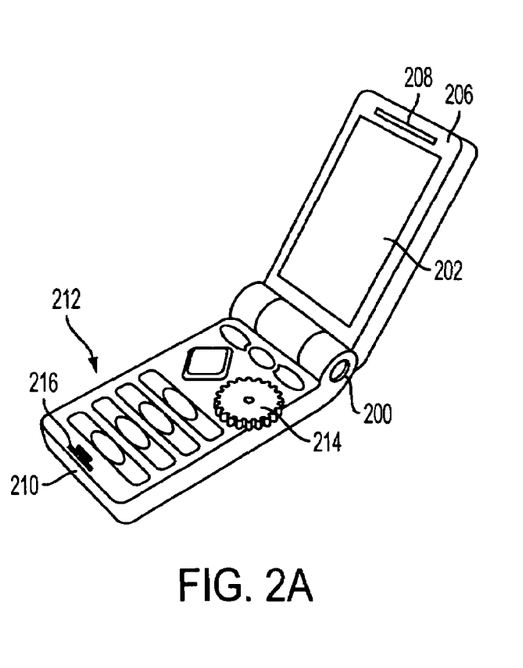
FIGS. 2a and 2b are different views of a mobile communication apparatus according to an embodiment of the present invention.
Figure 2B:
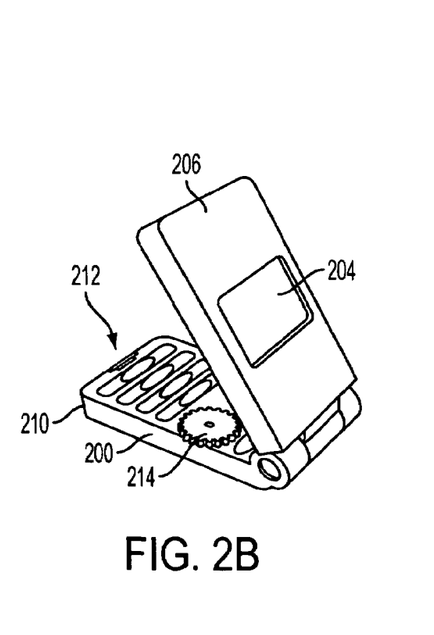

FIGS. 2a and 2b are different views of a mobile communication apparatus 200 according to an embodiment of the present invention. The mobile communication apparatus comprises a first display 202 and a second display 204. The mobile communication apparatus 200 can have a so called clamshell structure with a first body 206 holding e.g. the first and second displays 202, 204, and a speaker 208. The first body 206 is hingedly connected to a second body 210 holding e.g. a keypad 212, a rotating dial 214, and a microphone 216.

Figure 3A:
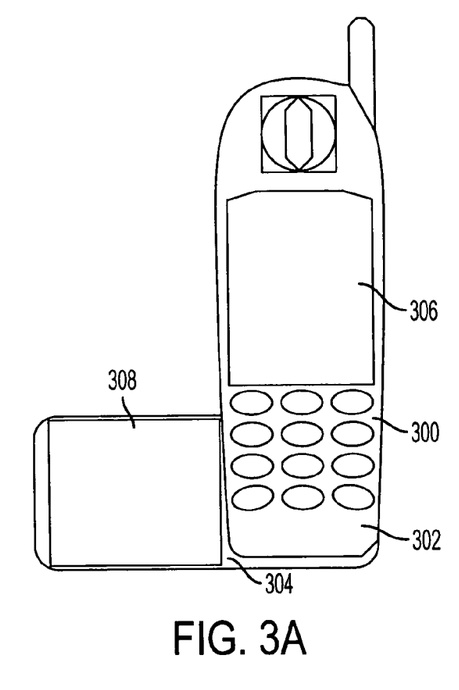
FIGS. 3a to 3d show a mobile communication apparatus according to an embodiment of the present invention.
Figure 3B:
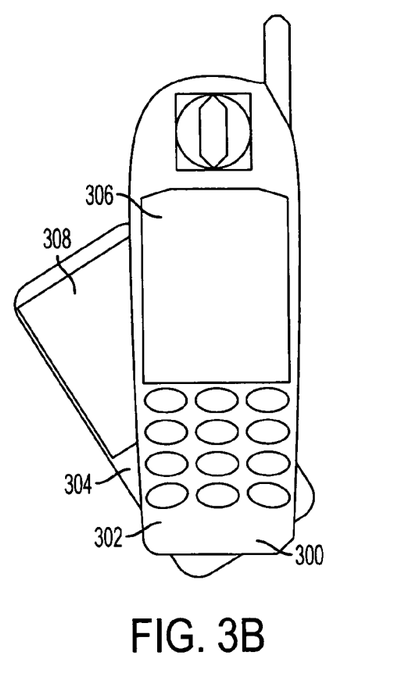
Figure 3C:
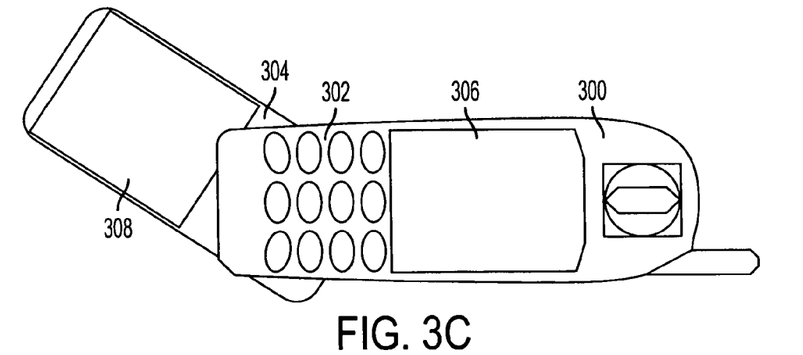
Figure 3D:
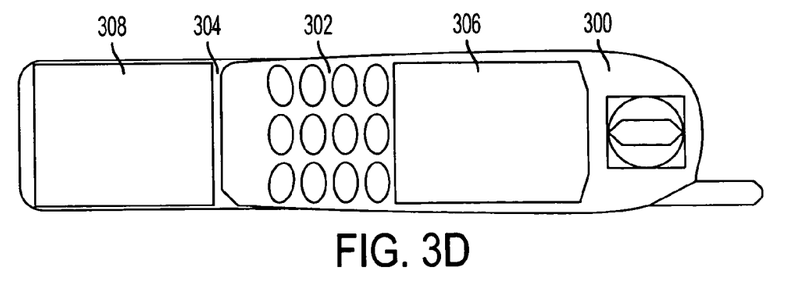

FIGS. 3a to 3d show a mobile communication apparatus 300, according to an embodiment of the present invention, the mobile communication apparatus comprising a first body 302 and a second body 304. The first body 302 comprises a first display 306 and the second body 304 comprises a second display 308, and the bodies 302, 304 are arranged such that they can be folded or turned in different configurations. FIG. 3a shows a state where the second display 308 can be used and viewed by a user simultaneously with the first display 306. FIG. 3b shows a state where the second body 304 is folded or turned in to a state where only the first display can be used and viewed by a user, e.g. for stand-by mode or services that do not require a secondary display. FIG. 3c shows a state where the second body 304 is folded or turned further than shown in FIG. 3a, preferably to end in a state shown in FIG. 3d, where the second display 308 can be used and viewed by a user simultaneously with the first display 306.

Figure 4:
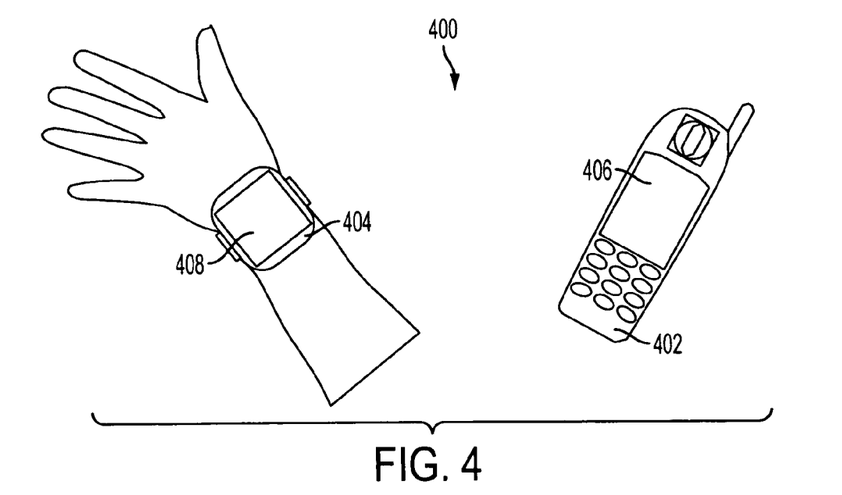
FIG. 4 shows a mobile communication apparatus configuration according to an embodiment of the present invention.

FIG. 4 shows a mobile communication apparatus configuration according to an embodiment of the present invention where a first display 406 is arranged on a main body 402 of a mobile communication apparatus 400, and a second display 408 is arranged on a remote body 404, e.g. in the form of a wristwatch, of the mobile communication apparatus. Connection between remote and main bodies 402, 404 can be wired or wireless.

Figure 5:
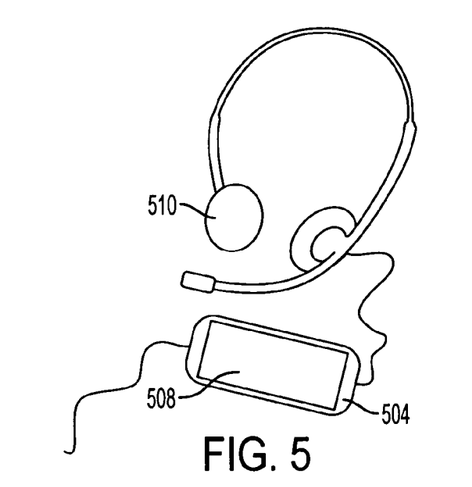
FIG. 5 shows a part of a mobile communication apparatus configuration according to an embodiment of the present invention.

FIG. 5 shows a part of a mobile communication apparatus configuration according to an embodiment of the present invention, where a remote body 504 of a mobile communication apparatus forms a part of a headset 510. The remote body 504 comprises a secondary display 508. Connection between remote and main bodies can be wired or wireless.

Figure 6:
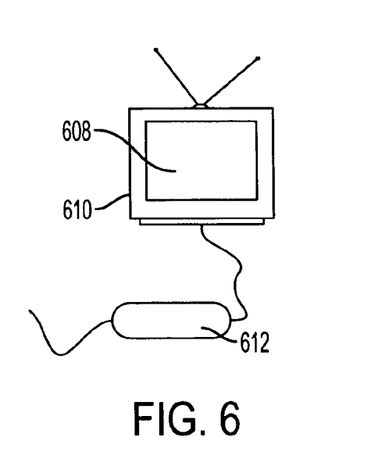
FIG. 6 shows a part of a mobile communication apparatus configuration according to an embodiment of the present invention.

FIG. 6 shows a part of a mobile communication apparatus configuration according to an embodiment of the present invention where a secondary display 608 of a mobile communication apparatus can be comprised of a television set 610. The secondary display 608 can also be a monitor, an LCD screen, an LCD projector, or any other remote video rendering system. The secondary display 608 can be connected to a main body (not shown) of the mobile communication apparatus via an interface 612. Connection can be wired or wireless.

The display configurations according to the above demonstrated embodiments enable an improved assignment of viewed information on the displays. Viewing can be optimized by using one display for rendering text information, and the other display for rendering images. Further, viewing can be optimized by using one display for a first application and the other display for a second application. The displays can be used for displaying different views related to an application. A single view can also be divided between the displays. The assignment of displays for applications, views, or parts of views can be user defined, application defined, or defined e.g. by an operating system of the mobile communication apparatus. FIGS. 7 to 11 will illustrate examples of assigning information to be viewed on the displays.

Figure 7A:
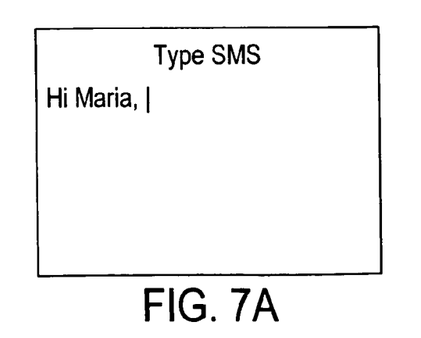
FIG. 7a is a view of a first display of a mobile communication apparatus.
Figure 7B:
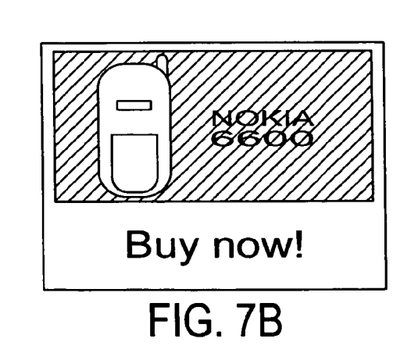
FIG. 7b is a view of a second display of the mobile communication apparatus, according to an embodiment of the present invention.

FIG. 7*a* is a view of a first display of a mobile communication apparatus, where an SMS application is run. FIG. 7*b* is a view of a second display of the mobile communication apparatus, where an advertising message is viewed. For example, by simultaneously viewing advertising messages in one display, a low price messaging service can be provided in the other display of course, other services are equally possible.

Figure 8A:
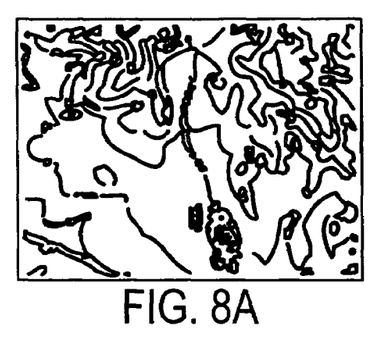
FIGS. 8a and 8b illustrates an example where different views of an application are viewed on the displays.
Figure 8B:
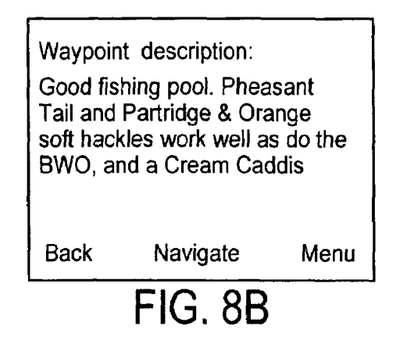

FIGS. 8*a* and 8*b* illustrate an example where different views of an application, here illustrated by a GPS application, are viewed on the displays. FIG. 8*a* is a view of a first display of a mobile communication apparatus, where an image of a map is viewed. FIG. 8*b* is a view of a second display of the mobile communication apparatus, where text based information related to the map is viewed. Menu information can also be viewed in the second display to enable a display area as large as possible in the first display to be used for the image.

Figure 9A:
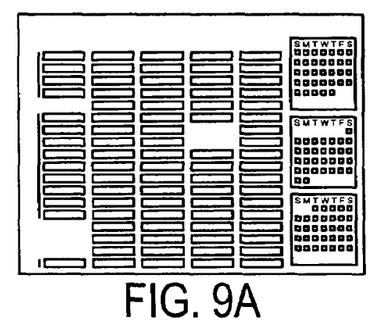
FIGS. 9a and 9b illustrates an example where different views of an application are viewed on the displays.
Figure 9B:
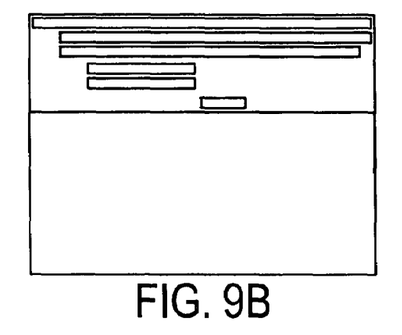

FIGS. 9*a* and 9*b* also illustrate an example where different views of an application, here illustrated by a calendar application, are viewed on the displays. FIG. 9*a* is a view of a first display of a mobile communication apparatus, where a calendar overview for e.g. a week is viewed. FIG. 9*b* is a view of a second display of the mobile communication apparatus, where information related to a single item, e.g. a meeting summon, in the calendar is viewed.

Figure 10A:
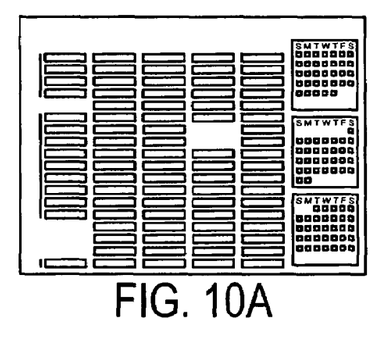
FIGS. 10a and 10b illustrates an example where different applications are viewed on the displays.
Figure 10B:
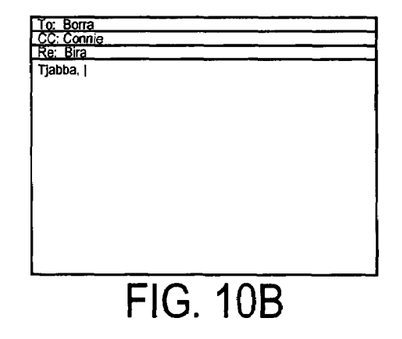

FIGS. 10*a* and 10*b* illustrate an example where different applications, here illustrated by a calendar application and a messaging service, are viewed on the displays. FIG. 10*a* is a view of a first display of a mobile communication apparatus, where a calendar overview for e.g. a week is viewed. FIG. 10*b* is a view of a second display of the mobile communication apparatus, where a message editor is viewed. Thus, the user is able to check her calendar on the other display while writing a message.

Figure 11A:
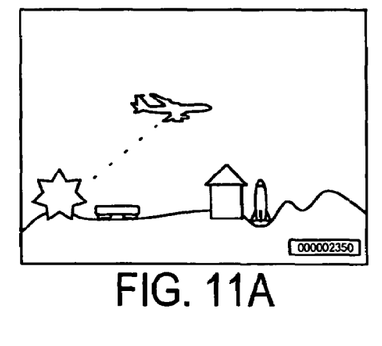
FIGS. 11a and 11b illustrates an example where different parts of a view of an application are viewed on the displays.
Figure 11B:
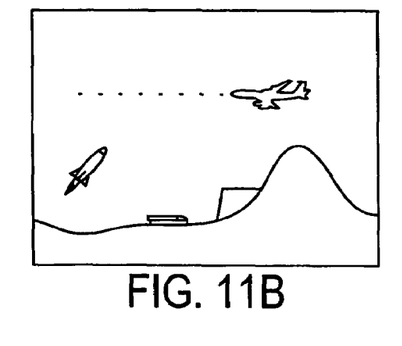

FIGS. 11*a* and 11*b* illustrate an example where different parts of a view of an application, here illustrated by a gaming application, are viewed on the displays. FIG. 11*a* is a view of a first display of a mobile communication apparatus, where an item in the game controlled by the user is viewed. FIG. 11*b* is a view of a second display of the mobile communication apparatus, where e.g. a counterpart item in the game is viewed.

Figure 12:
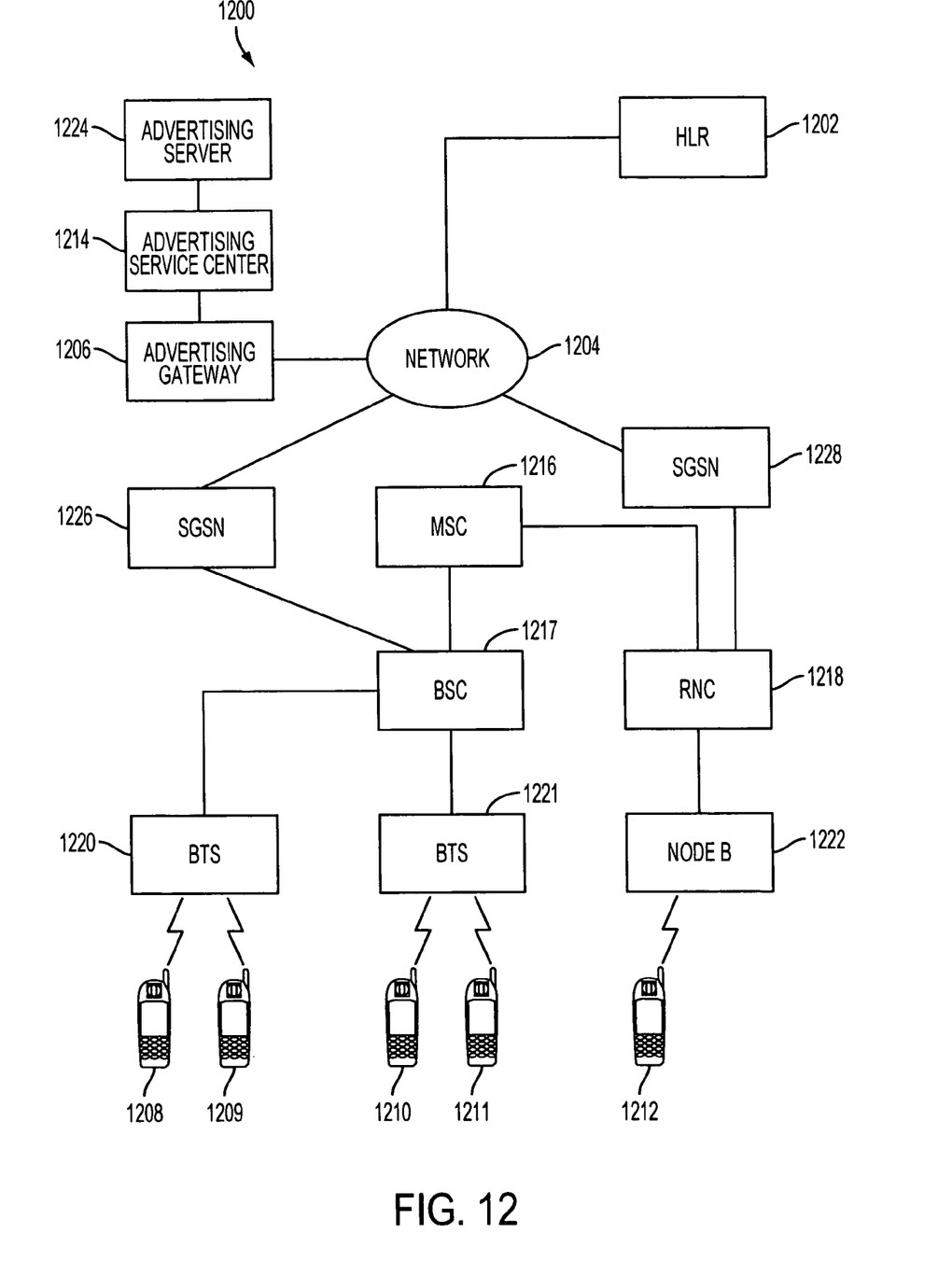
FIG. 12 shows a system architecture for managing a system according to an embodiment of the present invention.

A system architecture for managing a system 1200 according to an embodiment of the present invention is shown in FIG. 12. A Home Location Register (HLR) 1202 contains a database (not shown) including relevant subscriber information for provision of telecommunication service. A CCITT specified network 1204 interconnects the individual parts of the system 1200. An advertising gateway 1206 is a switching unit routing an advertising message to a mobile communication apparatus 1208-1212. An Advertising Service Center 1214 (ASC) and the advertising gateway 1206 handles and routes the advertising messages between the ASC 1214 and the network 1204. From the network 1204, the advertising messages are routed to the mobile communication apparatuses 1208-1212 via a Mobile Switching Center (MSC) 1216 to a Base Station Controller (BSC) 1217 and a Base Transceiver Station (BTS) 1220, 1221, or a Radio Network Controller (RNC) 1218 and a Node B 1222. Alternatively, the advertising messages are routed to the mobile communication apparatuses 1208-1212 via a Serving GPRS Support Node (SGSN) 1226, 1228 to the BSC 1217 and the BTS 1220, 1221, or the RNC 1218 and the Node B 1222, respectively. The BTS 1220, 1221 or the Node B 1222 establish the air connection to the mobile communication apparatuses 1208-1212.

According to an embodiment of the present invention, a network operator or other third party company handling an advertising server 1224 could offer an advertising function. For example a network operator may have an advertising server 1224 supporting a feature where the advertiser may provide advertisements and the users may send an advertisement admission from their mobile communication apparatuses 1208-1212 to the advertising server 1224, and in exchange for the admission be provided low cost services. This advertising server 1224 automatically may place people sending a similar admission to the advertising server 1224 into "advertising groups" or "advertising rooms".

Figure 13:
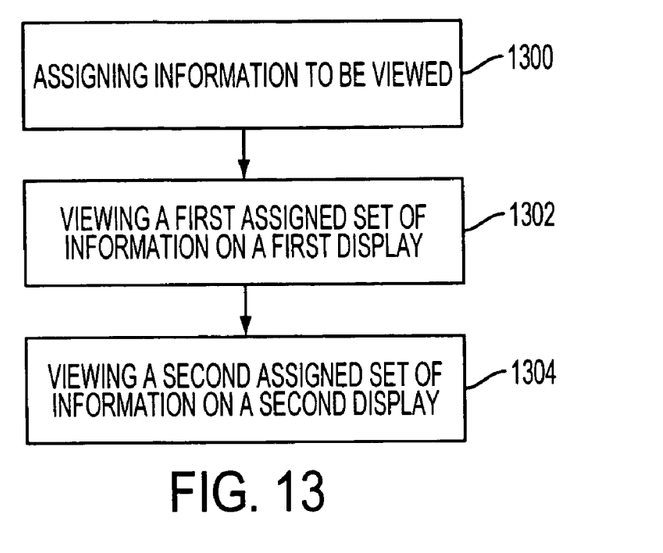
FIG. 13 is a flow chart illustrating a method according to an embodiment of the present invention.

FIG. 13 is a flow chart illustrating a method according to an embodiment of the present invention. In an assignment step 1300, information to be viewed in each of the displays are assigned. This can be done by a user, by an application, or by an operating system of the mobile communication apparatus. In a first viewing step 1302, a first assigned set of information is viewed on a first display, and in a second viewing step 1304, a second assigned set of information is viewed on a second display of the mobile communication apparatus.

Figure 14:
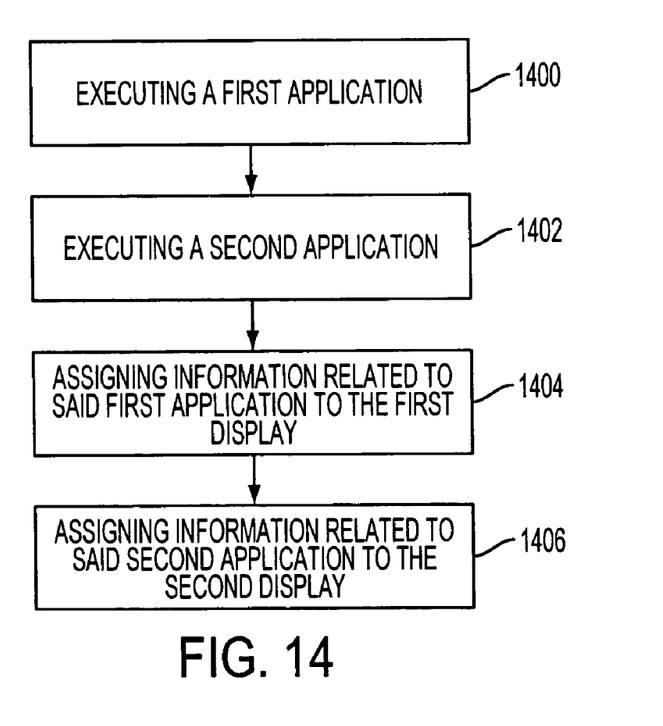
FIG. 14 is a flow chart illustrating how information to be viewed is assigned to displays according to an embodiment of the present invention.

FIG. 14 is a flow chart illustrating how information to be viewed is assigned to displays according to an embodiment of the present invention. In a first execution step 1400, a first application is executed, and in a second execution step 1402, a second application is executed. In a first assignment step 1404, information to be viewed related to the first application is assigned to a first display, and in a second assignment step 1406, information to be viewed related to the second application is assigned to a second display.

Figure 15:
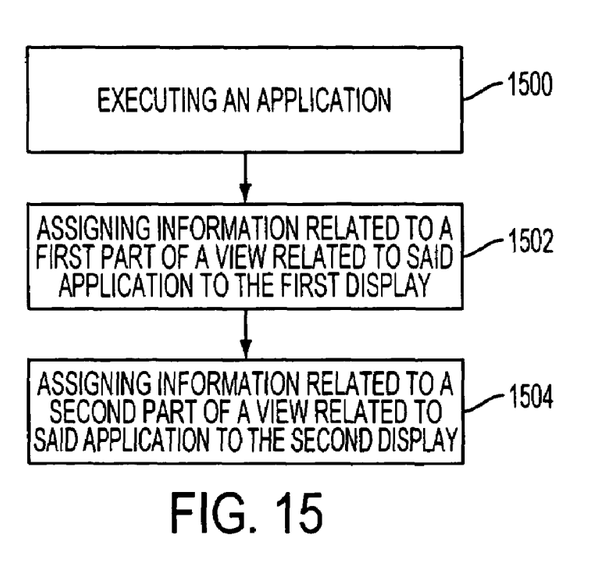
FIG. 15 is a flow chart illustrating how information to be viewed is assigned to displays according to an embodiment of the present invention.

FIG. 15 is a flow chart illustrating how information to be viewed is assigned to displays according to an embodiment of the present invention. In an execution step 1500, an application is executed. In a first assignment step 1502, information to be viewed related to a first part of a view related to the application is assigned to a first display, and in a second assignment step 1504, information to be viewed related to a second part of a view related to the application is assigned to a second display.

Figure 16:
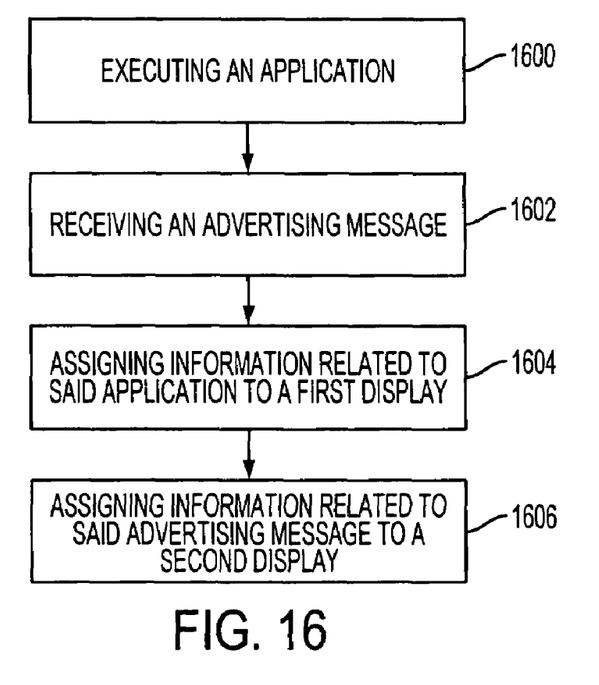
FIG. 16 is a flow chart illustrating how information to be viewed is assigned to displays according to an embodiment of the present invention.

FIG. 16 is a flow chart illustrating how information to be viewed is assigned to displays according to an embodiment of the present invention. In an execution step 1600, an application is executed. In an advertisement reception step 1602, an advertising message is received. In a first assignment step 1604, information to be viewed related to the application is assigned to a first display, and in a second assignment step 1606, advertising information to be viewed related to the received advertising message is assigned to a second display.

Figure 17:
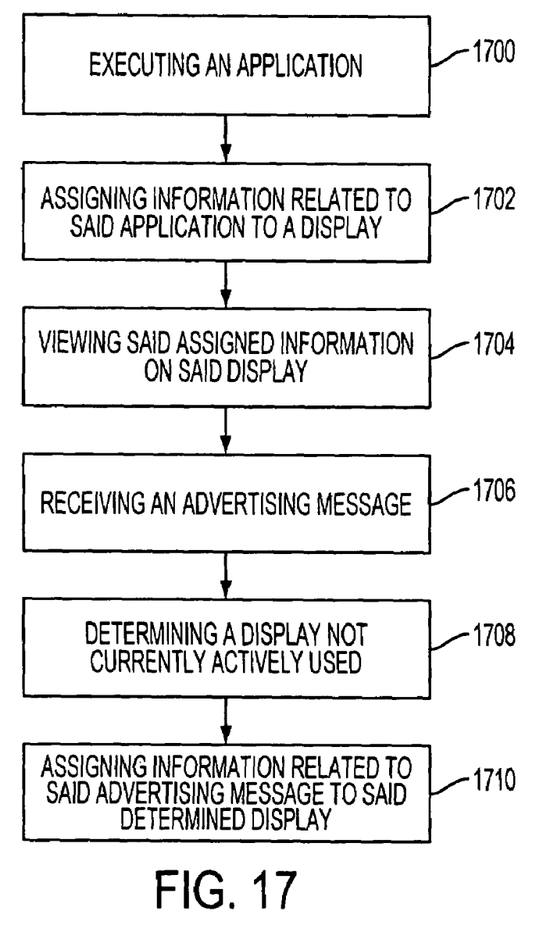
FIG. 17 is a flow chart illustrating how information to be viewed is assigned to displays according to an embodiment of the present invention.

FIG. 17 is a flow chart illustrating how information to be viewed is assigned to displays according to an embodiment of the present invention. In an execution step 1700, an application is executed. In a first assignment step 1702, information to be viewed related to the application is assigned to a display, and said assigned information is viewed, in a first viewing step 1704, on said assigned display. In an advertisement reception step 1706, an advertising message is received. In a determination step 1708, it is determined if any display is not currently actively used, i.e. not the display viewing information related to the application, and in a second assignment step 1710, advertising information to be viewed related to the received advertising message is assigned to a display determined not to be actively used.

Figure 18:
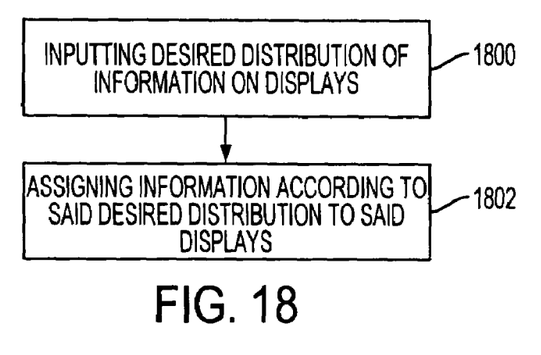
FIG. 18 is a flow chart illustrating how information to be viewed is assigned to displays according to an embodiment of the present invention.

FIG. 18 is a flow chart illustrating how information to be viewed is assigned to displays according to an embodiment of the present invention. In a distribution input step 1800, a desired distribution of information on displays is input. The input can be made by a user, by an application, or by an operating system. In an information assignment step 1802, information to be viewed is assigned according to the desired distribution of information on the displays.

The above described steps can be performed in other orders than mentioned above, or in parallel. The terms "first", "second", etc. above are only used to discriminate different elements, and do not indicate any timing or priority.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A portable apparatus comprising a controller, and being associated with a first display and a second display, wherein said controller is arranged to control said first display to present a first set of information and said second display to, simultaneously, present a second set of information, wherein said first set of information and said second set of information have different content and further wherein said sets of information are selected from one or more of the following sets of information:
    a first set of information comprising image information and a second set of information comprising text information;
    a first set of information associated with a first application and a second set of information is associated with a second application;
    first and second sets of information presented according to a user, an application, or an operating system defined assignment; and/or
    a first set of information relating to an application executed on said apparatus on request of a user, and a second set of information relating to an advertising message provided from a telecommunication network in which said apparatus is arranged to work.

2. The portable apparatus according to claim 1, wherein said first and second displays are arranged in said portable apparatus.

3. The portable apparatus according to claim 1, wherein one of said first and second displays is arranged in an external device, said device being a watch, a headset, a hands free device, or a video system.

4. The portable apparatus according to claim 1, arranged to assign incoming message information to one of said first or second display not currently actively used to avoid interruption of an active session.

5. A portable apparatus according to claim 1, wherein:
    the first display is mounted on a first body, said body having a longitudinal plane; and
    the second display is constructed in a second body, and wherein said second body is attached to the first body for rotational movement about an axis perpendicular to the longitudinal plane of said first body.

6. A portable apparatus according to claim 5, wherein the first and second bodies have longitudinal axis and are relatively moveable in parallel planes to a position in which the longitudinal axis of the second body extends perpendicular to the longitudinal axis of the first body, and wherein both displays are visible.

7. A portable apparatus according to claim 5, wherein the first and second bodies have longitudinal axis and are relatively moveable in parallel planes to a position in which the longitudinal axis of the second body is aligned with the longitudinal axis of the first body, and wherein both displays are visible.

8. A method for controlling a portable apparatus being associated with a first display and a second display, comprising:
    presenting on said first display a first set of information, and
    simultaneously presenting on said second display a second set of information; and
    wherein said first set of information and said second set of information have different content; and
    further wherein said sets of information are selected from one or more of the following sets of information:
    a first set of information comprising image information and a second set of information comprising text information;
    a first set of information associated with a first application and a second set of information is associated with a second application;
    first and second sets of information presented according to a user, an application, or an operating system defined assignment; and/or
    a first set of information relating to an application executed on said apparatus, and a second set of information relating to an advertising message provided from a telecommunication network in which said apparatus is arranged to work.

9. The method according to claim 8, further comprising receiving a message comprising message information;
determining if one of said first and second displays is currently actively used; and assigning said message information to the one of said first or second display not currently actively used to avoid interruption of an active session.

10. A computer program product stored in a memory of a mobile communication device comprising computer readable program code that, when executed in the mobile communication terminal, causes the mobile communications terminal to perform the method according to claim 8.

11. A telecommunication system comprising a mobile telecommunication network and a mobile communication apparatus arranged to communicate with said mobile telecommunication network, wherein said mobile communication apparatus comprises a controller, and is associated with a first display and a second display, wherein said controller is arranged to control said first display to present a first set of information and said second display to simultaneously present a second set of information and wherein said first set of information and said second set of information have different content; and further wherein said sets of information are selected from one or more of the following sets of information:
- a first set of information comprising image information and a second set of information comprising text information;
- a first set of information associated with a first application and a second set of information is associated with a second application;
- first and second sets of information presented according to a user, an application, or an operating system defined assignment; and/or
- a first set of information relating to an application executed on said apparatus, and a second set of information relating to an advertising message provided from a telecommunication network in which said apparatus is arranged to work.

12. The telecommunication system according to claim 11, wherein said first and second displays are arranged in said mobile communication apparatus.

13. The telecommunication system according to claim 11, wherein one of said first and second displays is arranged in an external device, said device being a watch, a headset, a hands-free device, or a video system.

14. The telecommunication system according to claim 11, wherein said telecommunication network comprises means for sending messages to said mobile communication apparatus, said mobile communication apparatus is arranged to receive said message, and further wherein said first set of information relates to an application executed on said mobile communication apparatus on request of a user, and said second set of information relates to said message provided from said telecommunication network.

15. The telecommunication system according to claim 14, wherein said message is an advertising message.

16. The telecommunication system according to claim 11, wherein said mobile communication apparatus is arranged to assign incoming message information to one of said first or second display not currently actively used to avoid interruption of an active session.

17. A method for providing messages in a telecommunication system comprising a mobile telecommunication network and a mobile communication apparatus arranged to communicate with said mobile telecommunication network and being associated with a first display and a second display, comprising:
- sending new message information from said mobile telecommunication network to said mobile communication apparatus;
- receiving said new message information by said mobile communication apparatus;
- determining if one of said first and second displays is currently being used to display message information previously received;
- assigning said new message information to the one of said first or second display not currently being used; and
- presenting said new message information on said assigned display without interrupting the presentation of the message information previously received; and
- wherein, in the event that it is determined that neither of said first or second displays is being used, then assigning the presentation of the new message information according to an inputted distribution.

18. The method according to claim 17, wherein said message is an advertising message.

19. A computer program product stored in a memory of a mobile communication device comprising computer readable program code that, when executed in the mobile communication terminal, causes the mobile communications terminal to perform the method according to claim 17.

* * * * *